(12) United States Patent
Slone

(10) Patent No.: US 12,480,798 B1
(45) Date of Patent: Nov. 25, 2025

(54) SYSTEMS AND METHODS FOR DETERMINING FLUID FILL METRIC OF FLUID IN A RECEPTACLE

(71) Applicant: Simple Labs, Inc., Calistoga, CA (US)

(72) Inventor: Mike Slone, Calistoga, CA (US)

(73) Assignee: SIMPLE LABS, INC.

( * ) Notice: Subject to any disclaimer, the term of this patent is extended or adjusted under 35 U.S.C. 154(b) by 0 days.

(21) Appl. No.: 18/952,400

(22) Filed: Nov. 19, 2024

Related U.S. Application Data

(63) Continuation-in-part of application No. 18/810,608, filed on Aug. 21, 2024, now Pat. No. 12,222,342.

(51) Int. Cl.
*G01F 23/263* (2022.01)
*G01N 33/14* (2006.01)

(52) U.S. Cl.
CPC ......... *G01F 23/263* (2013.01); *G01N 33/146* (2013.01)

(58) Field of Classification Search
CPC .......... G01F 23/00; G01F 23/22; G01F 23/26; G01F 23/263; G01F 23/265; G01F 23/266; G01F 23/268; G01F 25/00; G01F 25/0084; G01F 25/20; G01N 33/00; G01N 33/14; G01N 33/146; G01N 33/15; G01N 21/00; G01N 21/01; G01N 2021/0106; G01N 2021/0112; G01N 2021/0118; G01N 27/00; G01N 27/22; G01N 27/221; G01N 27/226; G01N 27/227; G01N 27/30; G01N 27/301; G01N 33/4972; C12H 1/22
See application file for complete search history.

(56) References Cited

U.S. PATENT DOCUMENTS

| | | | | |
|---|---|---|---|---|
| 4,730,489 A * | 3/1988 | Hoekstra | ............... | G01F 23/263 |
| | | | | 73/304 C |
| 4,890,492 A * | 1/1990 | Andrejasich | ............ | G01F 23/24 |
| | | | | 73/304 R |
| 2022/0065843 A1* | 3/2022 | Slone | ................... | G01N 33/146 |
| 2023/0324323 A1* | 10/2023 | Cesnik | .................. | G01F 23/804 |

FOREIGN PATENT DOCUMENTS

EP 1462775 A1 * 9/2004 ............. G01F 23/26

* cited by examiner

*Primary Examiner* — Son T Le
*Assistant Examiner* — Matthew W. Baca
(74) *Attorney, Agent, or Firm* — Evergreen Valley Law Group; Kanika Radhakrishnan

(57) ABSTRACT

The present invention relates to systems and methods for determining fluid fill metric of fluid (e.g., wine, bourbon, etc.) in a receptacle and evaluating fluid quality. The sensing device includes an outer housing and an inner housing. The inner housing includes a cavity adapted to receive a portion of a fluid stored in the receptacle while the sensing device is inserted into the receptacle. The sensing device includes a first sensor module configured to generate an electric field based on detecting at least one electrical parameter of the portion of the fluid in the cavity. The sensing device includes a control circuitry communicably coupled to the first sensor module. The control circuitry determines a fluid fill metric of the fluid in the receptacle and generates sensory data based on processing the fluid fill metric, the ambient parameters, and one or more parameters associated with the fluid.

17 Claims, 10 Drawing Sheets

SYSTEMS AND METHODS FOR DETERMINING FLUID FILL METRIC OF FLUID IN A RECEPTACLE

TECHNICAL FIELD

The present invention relates to electronic systems for detecting fluid fill metric, and more particularly relates to systems and methods for determining fluid fill metric of fluid (e.g., wine, bourbon, etc.) stored in receptacles and evaluating fluid quality.

BACKGROUND

Containers storing liquids may be configured to store for prolonged periods ranging from several months to years. For example, alcoholic beverages such as wine, beer, rum, whisky, and the like may require storage in a barrel (or a container) for an extended time during their production. However, some containers may not be fully airtight, whether by design or due to limitations, leading to potential loss of liquid through evaporation, leakage, or other means, which can reduce the volume over time. For example, wooden barrels containing the liquids may evaporate naturally overtime, which is a necessary part of the distillation process. Further, the airtight seal may be crucial for spirits like wines and spirits, but in the case of wine, an airtight seal may monitor the health of the liquid inside the barrel. Numerous processes are monitored by manually sampling the containers and such existing processes are costly and labor intensive. Further, infrequent testing increases the risk of adverse reactions in the containers. Furthermore, the cost and effort associated with manual testing prevent the users (e.g., winemakers) from determining concentrations of key components in real-time.

Further, the containers storing the liquids, such as bourbon, are often designed to hold them for extended periods, ranging from several months to years. For instance, in bourbon production, storage in the containers is necessary to achieve the desired aging. During this aging process, evaporation occurs, thus leading to an increase in the alcohol concentration. Consequently, the dielectric constant of the bourbon changes over time as the mixture in the container evolves. This rate of change varies according to production practices and environmental conditions, and no fixed rate can be applied. These factors make calculating the dielectric constant complex, yet accurate calculation is essential for precise monitoring of the aging process.

In recent times, wireless sensors allow users to access real-time data on wireless devices. Typically, the wireless sensors are used in many industries to provide convenient and useful ways of obtaining data. However, there are several potential problems and challenges associated with the existing technologies. For example, the dielectric constant of the mixture changes over time, which alters the concentration. Since the sensors rely on changes in the dielectric constant to determine the level of the liquid, it leads to inaccurate readings. As the liquid mixture ages, the dielectric constant will progressively decrease. If relying on a single reading to assess the level, the sensor might interpret the changes in dielectric constant (caused by aging) as changes in the liquid level itself, thus leading to inaccurate readings. Additionally, environmental factors such as extreme temperature changes and high humidity or condensation may affect the sensor performance and accuracy, resulting in false readings and cause malfunctions.

Therefore, there is a need for systems and methods for determining a fluid fill metric of the liquid (e.g., wine, bourbon, etc.) stored in the containers and evaluating fluid quality that overcomes the aforementioned deficiencies along with providing other advantages.

SUMMARY

Various embodiments of the present disclosure disclose methods and systems for determining fluid fill metric of fluid (e.g., wine, bourbon, etc.) stored in receptacles and evaluating fluid quality.

In an embodiment, a sensing device is disclosed. The sensing device includes an outer housing and an inner housing. The inner housing includes a cavity along a longitudinal axis of the inner housing. The outer housing is configured in conformity to the inner housing for receiving the inner housing therein. The cavity of the inner housing is adapted to receive a portion of a fluid stored in a receptacle while the sensing device is inserted into the receptacle. Further, the sensing device includes at least one first sensor module disposed in the inner housing. The at least one first sensor module is configured to generate an electric field based on detecting at least one electrical parameter of the portion of the fluid in the cavity. The sensing device further includes a control circuitry communicably coupled to the at least one first sensor module. The control circuitry is configured at least, in part to determine a fluid fill metric of the fluid in the receptacle based at least on the at least one electrical parameter associated with the portion of the fluid in the cavity of the inner housing and ambient parameters of the receptacle. Further, the control circuitry is configured to generate sensory data based at least on processing the fluid fill metric, the ambient parameters, and one or more parameters associated with the fluid. The sensory data is transmitted to a central control module for detecting a fluid quality of the fluid in the receptacle.

In another embodiment, a method for determining a fluid fill metric is disclosed. The method includes generating, by at least one first sensor module of a sensing device, an electric field based on detecting at least one electric parameter of a fluid in a cavity. Further, the method includes determining, by a control circuitry of the sensing device, the fluid fill metric of the fluid stored in a receptacle based at least on the at least one electric parameter associated with a portion of the fluid in the cavity of an inner housing and ambient parameters of the receptacle. The method further includes generating, by the control circuitry of the sensing device, sensory data based at least on processing the fluid fill metric, the ambient parameters, and one or more parameters associated with the fluid, wherein the sensory data is transmitted to a central control module for detecting a fluid quality of the fluid in the receptacle.

In yet another embodiment, a sensing device is disclosed. The sensing device includes an outer housing and an inner housing. The inner housing includes a cavity along a longitudinal axis of the inner housing. The outer housing is configured in conformity to the inner housing for receiving the inner housing therein. The cavity of the inner housing is adapted to receive a portion of a fluid stored in a receptacle while the sensing device is inserted into the receptacle. Further, the sensing device includes at least one first sensor module disposed in the inner housing. The at least one first sensor module is configured to generate an electric field based on detecting at least one electrical parameter of the portion of the fluid in the cavity. The sensing device further includes a control circuitry communicably coupled to the at least one first sensor module. The control circuitry is configured at least, in part to determine a fluid fill metric of the fluid in the receptacle based at least on the at least one electrical parameter associated with the portion of the fluid in the cavity of the inner housing and ambient parameters of the receptacle. Further, the control circuitry is configured to generate sensory data based at least on processing the fluid fill metric, the ambient parameters, and one or more parameters associated with the fluid. The sensory data is transmitted to a central control module for detecting a fluid quality of the fluid in the receptacle. Further, the fluid fill metric indicates a ratio of a first element and a second element of the fluid stored in the receptacle. The first element includes water, and the second element includes at least one of alcohol content of the fluid. The ratio of the first element to the second element of the fluid in the receptacle indicates the fluid quality of the fluid in the receptacle.

BRIEF DESCRIPTION OF THE FIGURES

The following detailed description of illustrative embodiments is better understood when read in conjunction with the appended drawings. For the purposes of illustrating the present disclosure, exemplary constructions of the disclosure are shown in the drawings. However, the present disclosure is not limited to a specific device, or a tool and instrumentalities disclosed herein. Moreover, those in the art will understand that the drawings are not to scale. Wherever possible, like elements have been indicated by identical numbers.

Figure 1:
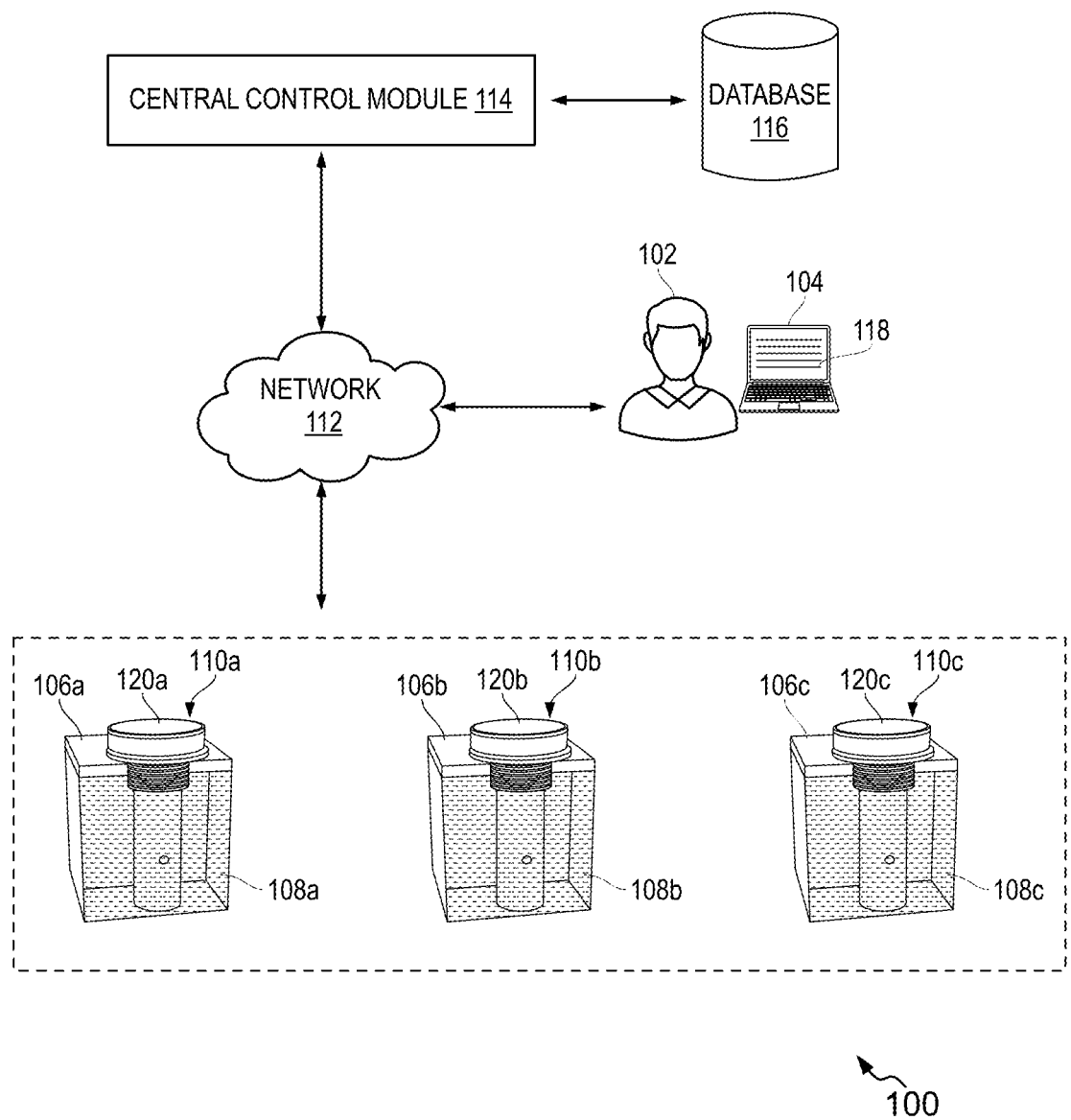
FIG. 1 illustrates an example representation of an environment related to at least some example embodiments of the present disclosure.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Reference in this specification to "one embodiment" or "an embodiment" means that a particular feature, structure, or characteristic described in connection with the embodiment is included in at least one embodiment of the present disclosure. The appearances of the phrase "in an embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features.

OVERVIEW

The present disclosure encompasses several embodiments of a system and a method for determining a fluid fill metric of fluid (e.g., wine, bourbon, etc.) stored in receptacles and evaluating fluid quality.

In an embodiment of the present disclosure, a sensing device is disclosed. The sensing device includes an outer housing and an inner housing. The inner housing includes a cavity along a longitudinal axis of the inner housing. The outer housing is configured in conformity to the inner housing for receiving the inner housing therein. The cavity of the inner housing is adapted to receive a portion of a fluid stored in a receptacle while the sensing device is inserted into the receptacle. Further, the sensing device includes at least one first sensor module disposed in the inner housing. The at least one first sensor module is configured to generate an electric field based on detecting at least one electrical parameter of the portion of the fluid in the cavity. The sensing device further includes a control circuitry communicably coupled to the at least one first sensor module. The control circuitry is configured at least, in part to determine a fluid fill metric of the fluid in the receptacle based at least on the at least one electrical parameter associated with the portion of the fluid in the cavity of the inner housing and ambient parameters of the receptacle. Further, the control circuitry is configured to generate sensory data based at least on processing the fluid fill metric, the ambient parameters, and one or more parameters associated with the fluid. The sensory data is transmitted to a central control module for detecting a fluid quality of the fluid in the receptacle.

The sensing device further includes at least one second sensor module disposed in the inner housing. The at least one second sensor module is configured to at least monitor one or more chemical components associated with the portion of the fluid, the one or more chemical components of the fluid including phenolic compounds, oxygen, carbon dioxide, acidic concentration, alcohol content, pH value, sugar content, phenolic compounds, and volatile compounds. The sensing device further includes at least one third sensor module configured to detect the ambient parameters of the receptacle. The ambient parameters include temperature and humidity. The at least one first sensor module includes a set of electrodes arranged in a co-planar configuration. The set of electrodes is configured to generate an electric field based on the at least one electrical parameter of the portion of the fluid in the cavity of the inner housing. The at least one electrical parameter corresponds to a dielectric constant.

Further, the electric field between the set of electrodes indicates a first capacitance associated with the set of electrodes. The at least one first sensor module is further configured to detect a second capacitance while the receptacle is empty. Furthermore, the fluid fill metric of the fluid in the receptacle is determined based at least on implementing a ratio-metric computing technique on the first capacitance, the second capacitance, a first reference capacitance of a reference liquid stored in the receptacle, a second reference capacitance associated with the ambient parameters of the receptacle, and a scaling factor. The fluid fill metric indicates a ratio of a first element and a second element of the fluid stored in the receptacle. The first element includes water, and the second element includes at least one of alcohol content of the fluid. The ratio of the first element to the second element of the fluid in the receptacle indicates a fluid quality of the fluid in the receptacle.

Further, the inner housing is configured with at least one channel along at least a length of the inner housing. The at least one first sensor module and at least one second sensor module are disposed in the at least one channel of the inner housing. The outer housing includes a set of first ports configured at a top portion of the outer housing and the inner housing includes a set of second ports configured at a top portion of the inner housing. The set of second ports is aligned parallel to the set of first ports while the inner housing is removably secured to the outer housing by inserting the top portion of the inner housing through a bottom portion of the outer housing. The set of second ports and the set of first ports are configured to equalize a level of the portion of the fluid in the cavity and the fluid stored in the receptacle. Further, the cavity is configured with an open configuration at a bottom portion of the inner housing and a closed configuration at a top portion of the inner housing.

Various embodiments of the present invention are described hereinafter with reference to FIG. 1 to FIG. 7.

FIG. 1 illustrates an example representation of an environment 100 related to at least some example embodiments of the present disclosure. Although the environment 100 is presented in one arrangement, other arrangements are also possible where the parts of the environment 100 (or other parts) are arranged or interconnected differently. The environment 100 corresponds to a system for determining a fluid fill metric and fluid quality. The present disclosure is described with reference to determining the fluid fill metric of the fluid (e.g., wine, bourbon). Alternatively, the system as disclosed in the environment 100 may be implemented to determine the fluid fill metric and the quality of other fluids such as alcoholic or non-alcoholic beverages.

The environment 100 includes a user 102 associated with a user device 104. The user device 104 may include at least a laptop computer, a phablet computer, a handheld personal computer, a Virtual Reality (VR) device, a netbook, a Web book, a tablet computing device, a smartphone, or other mobile computing devices. Further, the environment 100 includes a plurality of receptacles such as a receptacle 106a, a receptacle 106b, and a receptacle 106c. The receptacles 106a, 106b, and 106c may be configured to store fluid such as fluid 108a, fluid 108b, and fluid 108c, respectively. The fluids 108a-108c may be one of wine and bourbon as explained above. For example, the fluid 108a stored in the receptacle 106a maybe wine, and the fluids 108b-108c stored in the receptacles 106b-106c, respectively, may be bourbon. Further, the receptacles 106a-106c are equipped with a sensing device such as a sensing device 110a, a sensing device 110b, and a sensing device 110c, respectively. Typically, the sensing device 110a-110c is inserted into the corresponding receptacles 106a-106c storing the corresponding fluids 108a-108c via an aperture (not shown in FIG. 1) defined in the receptacles 106a-106c. The sensing devices 110a-110c are configured to determine the fluid fill metric of the fluids 108a-108c stored in the corresponding receptacles 106a-106c and ambient parameters of each of the receptacles 106a-106c which will be explained further in detail.

Various entities in the environment 100 may connect to a network 112 in accordance with various wired and wireless communication protocols, such as Transmission Control Protocol and Internet Protocol (TCP/IP), User Datagram Protocol (UDP), 2nd Generation (2G), 3rd Generation (3G), 4th Generation (4G), 5th Generation (5G) communication protocols, Long Term Evolution (LTE) communication protocols, Long Range (LoRa) Gateway Protocol or any combination thereof. In some instances, the network 112 may include a secure protocol (e.g., Hypertext Transfer Protocol (HTTP)), and/or any other protocol, or set of protocols. In an example embodiment, the network 112 may include, without limitation, a local area network (LAN), a wide area network (WAN) (e.g., the Internet), a mobile network, a virtual network, and/or another suitable public and/or private network capable of supporting communication among two or more of the entities illustrated in FIG. 1, or any combination thereof.

In an embodiment, the user 102 may be an individual associated with managing the fluid fill metric and the fluid quality of the fluids 108a-108c in the corresponding receptacles 106a-106c. In another embodiment, the user 102 may be a worker or a technician in a winery production industry and is associated with tracking and monitoring fluid parameters (such as the fluid fill metric and the fluid quality) of the fluids 108a-108c in the corresponding receptacles 106a-106c. Herein, the fluid quality may correspond to determining the aging of the fluid (e.g., wine or bourbon) stored in the receptacles i.e., the receptacles 106a-106c. Further, tracking the fluid fill metric over time can help estimate evaporation from a wine barrel (such as the receptacles 106a-106c). Typically, if the wine barrel (i.e., the receptacles 106a-106c) is stored under controlled conditions, a consistent decrease in volume (without leakage) is primarily due to evaporation. The rate of volume reduction may be used to estimate evaporation, as water and alcohol evaporate at different rates. Thus, monitoring alcohol concentration provides insights into whether water or ethanol is evaporating faster.

The environment 100 further includes a central control module 114. In an embodiment, the central control module 114 may be embodied in at least one computing device in communication with the network 112. In an embodiment, the central control module 114 may be embodied in the user device 104. In another embodiment, the central control module 114 may be an individual entity located remotely and communicably coupled to the entities of FIG. 1 via the network 112. The central control module 114 may be specifically configured, via executable instructions to perform one or more of the operations described herein. In general, the central control module 114 is configured to predict the fluid quality of the fluid (e.g., the fluid 108a) stored in the receptacle (e.g., the receptacle 106a) which will be explained further in detail. Further, the central control module 114 may be configured to host and manage an application 118. The application 118 is a set of computer-executable codes configured to allow the user 102 to track and/or visualize the fluid fill metric and the fluid quality of the fluids 108a-108c stored in the corresponding receptacles 106a-106c. In one embodiment, the application 118 may be accessed as a web-based application on the user device 104. In another embodiment, the user device 104 may access an instance of the application 118 from the central control module 114 for installation on the user device 104 using application stores associated with operating systems such as Apple IOS®, Android™ OS, Google Chrome OS, Symbian OS®, Windows Mobile® OS, and the like.

For description purposes, the present invention is explained with reference to the sensing device 110a configured to detect the fluid fill metric of the fluid in the receptacle over time. It is apparent that the one or more operations being performed by the sensing device 110a may be implemented by the sensing devices 110b and 110c.

As shown, the sensing device 110a is inserted in the receptacle 106a. The sensing device 110a is configured to determine the one or more parameters (such as the fluid fill metric and the fluid quality) associated with the fluid 108a and the ambient parameters of the receptacle 106a. The sensing device 110a may include sensors configured to detect the fluid fill metric of the fluid 108a in the receptacle 106a and the ambient parameters of the receptacle 106a. The ambient parameters of the receptacle 106a may include but are not limited to, ambient temperature and humidity. The sensing device 110a transmits the fluid fill metric of the fluid 108a in the receptacle 106a and the ambient parameters of the receptacle 106a to the central control module 114 via a communication interface (not shown in FIG. 1) associated with the sensing device 110a. For example, the sensing device 110a may communicate with the central control module 114 using wireless communication protocols. Some examples of the wireless communication protocols may include, but are not limited to, Near-Field Communication (NFC), Wireless Fidelity (Wi-Fi), Bluetooth, and the like.

The central control module 114 determines the fluid quality of the fluid 108a stored in the receptacle 106a. The central control module 114 may store the fluid fill metric of the fluid 108a determined over time in a database 116 associated with the central control module 114. Further, the central control module 114 may render the fluid fill metric and the fluid quality of the fluid 108a in the receptacle 106a on the user device 104. The user 102 may access the real-time fluid fill metric and the fluid quality of the fluid 108a in the receptacle 106a by providing inputs in the application 118 equipped in the user device 104. Thus, this approach provides real-time testing of the fluid 108a without manual intervention, enables continuous monitoring of the fluid 108a in the receptacle 106a, provides immediate insights into the fluid 108a to monitor threats throughout the life cycle, and results in improved wine quality tracking.

The number and arrangement of systems, devices, and/or networks shown in FIG. 1 are provided as an example. There may be other systems, devices, and/or networks; fewer systems, devices, and/or networks; different systems, devices, and/or networks, and/or differently arranged systems, devices, and/or networks than those shown in FIG. 1. Furthermore, two or more systems or devices shown in FIG. 1 may be implemented within a single system or device, or a single system or device shown in FIG. 1 may be implemented as multiple, distributed systems or devices.

Figure 2A:
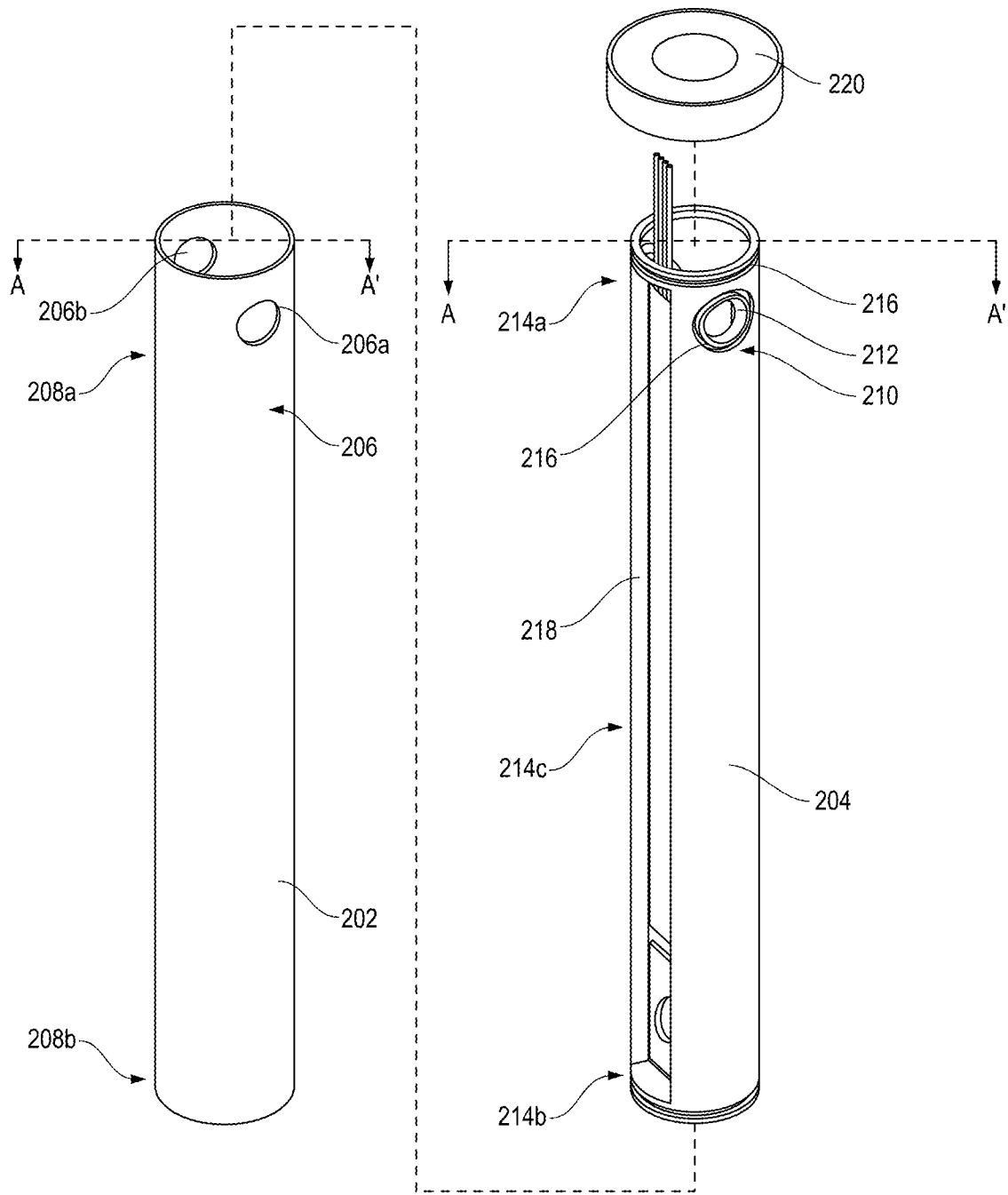
FIG. 2A illustrates an exploded view of a sensing device, in accordance with an embodiment of the present disclosure.

FIG. 2A illustrates an exploded view of a sensing device 200, in accordance with an embodiment of the present disclosure. The sensing device 200 is an example of the sensing devices 110a, 110b, and 110c as explained with reference to FIG. 1. In an example, the sensing device 200 may be disposed in the receptacle 106a to detect the fluid fill metric of the fluid 108a in the receptacle 106a over time.

As shown, the sensing device 200 includes an outer housing 202. The outer housing 202 is configured to be an elongated structure or a cylindrical structure. The cylindrical structure of the outer housing 202 minimizes interference with the fluid 108a or sediment inside the receptacle 106a, thus reducing turbulence or disruption of the fluid 108a during measurement. Alternatively, the outer housing 202 may be configured in various structural configurations as per the design feasibility and requirements. In an embodiment, the outer housing 202 may be a module structure. In the modular structure, the outer housing 202 may include a first part and a second part (not shown in figures) bifurcated centrally along the length of the outer housing 202. In other words, the outer housing 202 including the first part and the second part may be configured to be a semi-circular structure. The first part and the second part may be detachably coupled to each other to form the outer housing 202. In this configuration, the first part and the second part detachably coupled to each other may form an air-tight connection to prevent the fluid 108a from entering the outer housing 202.

Further, the outer housing 202 may be made of food-grade materials, for example, stainless steel, aluminum, food-grade plastic, or any other materials as per the design feasibility and requirements. It is to be noted that the components (e.g., the outer housing 202) of the sensing device 200 that are in contact with the fluid 108a made using the food-grade materials as explained above are unreactive or non-responsive to the fluid 108a. As a result, the fluid quality and the fluid fill metric of the fluid 108a are predicted accurately which will be explained further in detail. Additionally, the materials used for fabricating the outer housing 202 should be corrosion-resistant as the inner environment of the receptacle 106a storing the fluid 108a may be acidic in nature. Further, the outer housing 202 or the sensing device 200 may be configured to maintain stability and functionality across a range of temperatures (for example, 10 to 25 degrees Celsius) as the fluid 108a storage ranges from cool cellars to warmer ambient temperatures.

Further, the sensing device 200 includes an inner housing 204. In an embodiment, the inner housing 204 may be a unitary structure. In another embodiment, the inner housing 204 may be a modular structure. Furthermore, the inner housing 204 is configured to support at least one or more components and electronic circuitry of the sensing device 200.

Figure 2B:
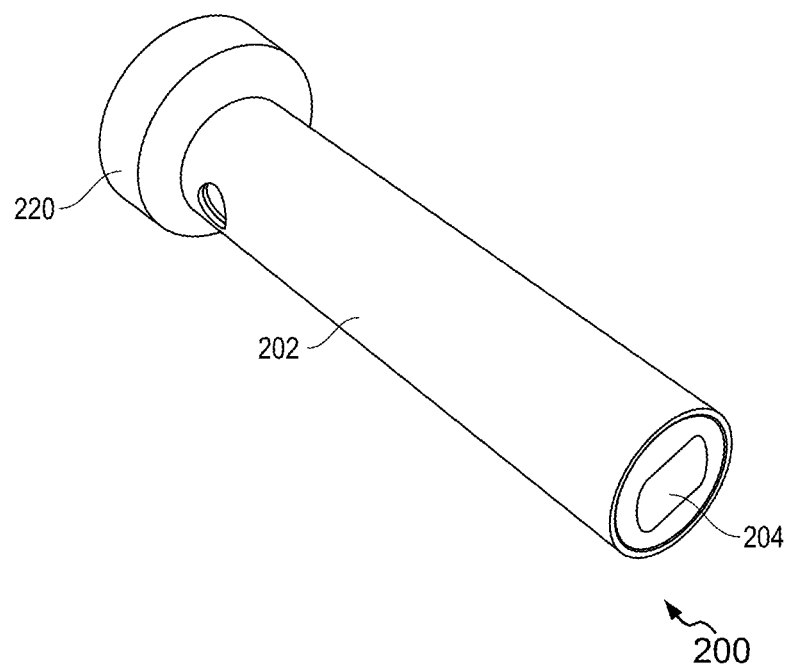
FIG. 2B is a schematic representation of the sensing device of FIG. 2A.

The outer housing 202 is configured in conformity to the inner housing 204 for receiving the inner housing 204 therein (as shown in FIG. 2B). In other words, the inner housing 204 is configured with a substantially cylindrical structure in conformity to an inner diameter of the outer housing 202. Thus, the inner housing 204 is configured to be inserted within the outer housing 202 (as shown in FIG. 2B).

The inner housing 204 inserted into the outer housing 202 corresponds to a telescopic configuration. In particular, the inner housing 204 is secured firmly within the outer housing 202 to prevent movement or rattling, which could interfere with the performance or readings of the sensing device 200. The inner housing 204 inserted in the outer housing 202 may be anchored in place to remain stable during operation. In particular, the inner housing 204 may include coupling members (not shown in figures) such as O-ring members that are configured to create a seal when the inner housing 204 is inserted into the outer housing 202. As shown, the inner housing 204 is configured with a set of grooves 216 at the top portion 214a, the bottom portion 214b, and around a set of second ports 210. The set of grooves 216 is configured to receive the coupling members that are configured to create the seal when the inner housing 204 is inserted into the outer housing 202.

Further, the inner housing 204 may be made of food-grade plastic materials or any other materials as per the design feasibility and requirements. It is to be noted that the components (e.g., the inner housing 204) of the sensing device 200 that are in contact with the fluid 108a made using the food-grade materials as explained above are unreactive or non-responsive to the fluid 108a. As a result, the fluid quality and the fluid fill metric of the fluid 108a are predicted accurately which will be explained further in detail. Additionally, the materials used for fabricating the inner housing 204 should be corrosion-resistant as the inner environment of the receptacle 106a storing the fluid 108a may be acidic.

Figure 6A:
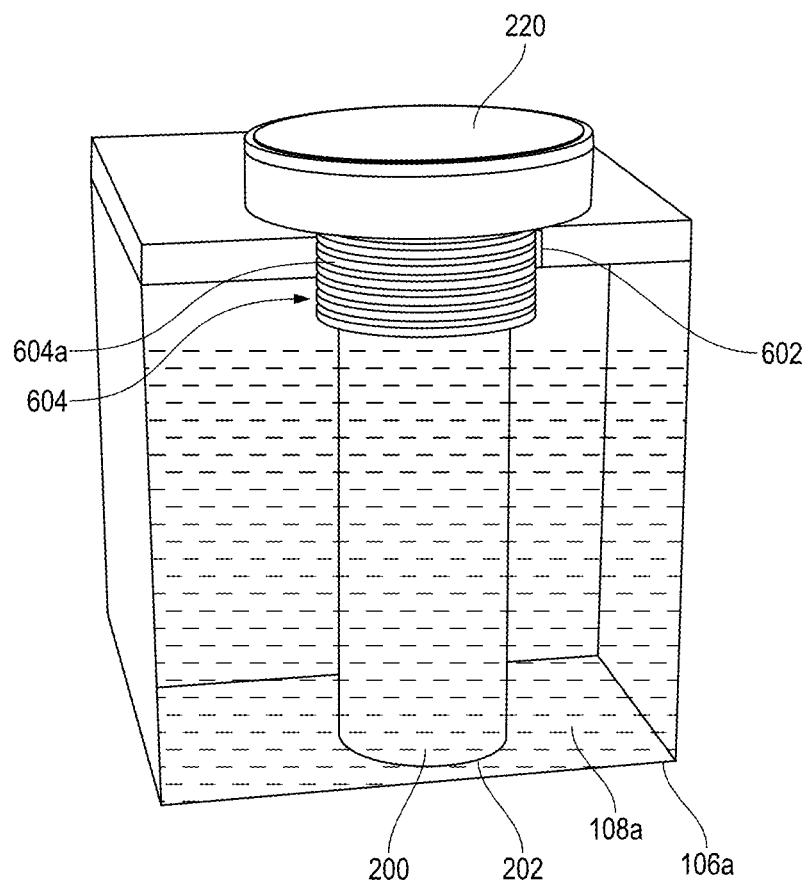
FIGS. 6A-6B illustrate a schematic representation of the sensing device including at least one fastening member, in accordance with an embodiment of the present disclosure.
Figure 6B:
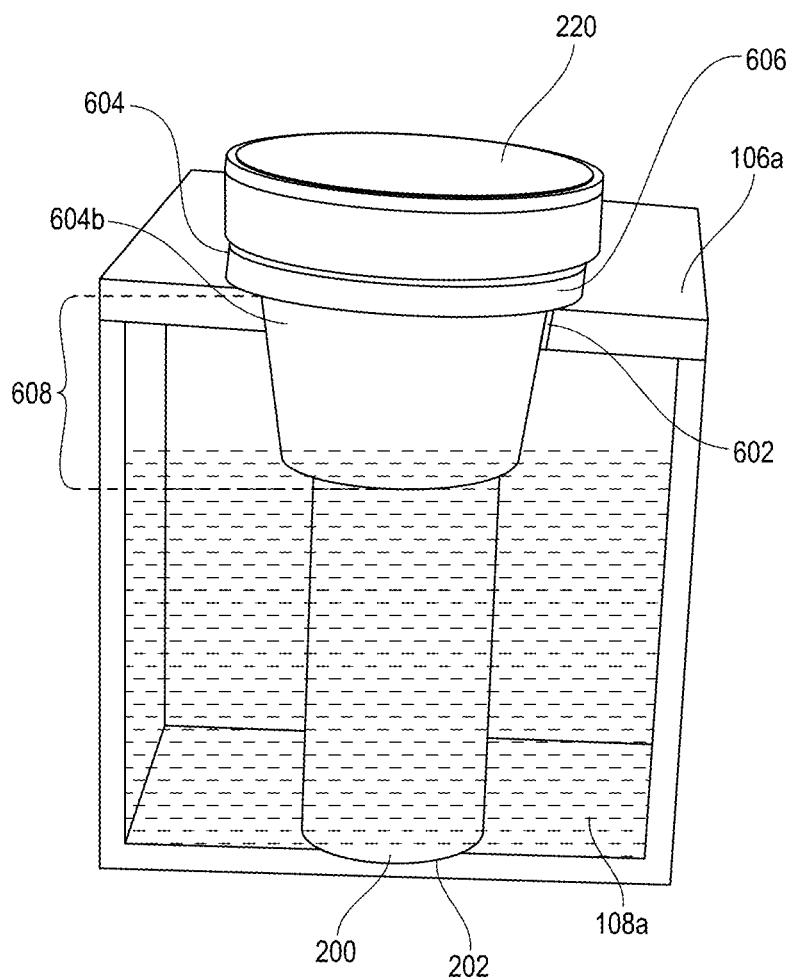

The outer housing 202 may be configured to include at least one fastening member (as shown in FIGS. 6A and 6B). The at least one fastening member is configured on a top portion 208a of the outer housing 202 for snuggly securing the sensing device 200 to at least one complementary fastening member (as shown in FIGS. 6A and 6B) configured in an aperture (see, 602 of FIGS. 6A and 6B) of the receptacle 106a designed for receiving the sensing device 200 therein.

In an embodiment, the at least one fastening member 604 may include a plurality of helical structures (see, 604a of FIG. 6A). The plurality of helical structures 604a is configured at the top portion 208a of the outer housing 202. Further, the aperture 602 of the receptacle 106a may be configured with complementary fastening members (not shown in figures) for removably engaging with the plurality of helical structures 604a, thereby allowing the sensing device 200 to be inserted in the receptacle 106a (as shown in FIG. 6A).

In another embodiment, the at least one fastening member 604 may include a silicon sleeve (see, 604b of FIG. 6B). The silicon sleeve 604b is configured at the top portion 208a of the outer housing 202. In this configuration, the silicon sleeve 604b includes a portion (see, 608 of FIG. 6B) configured with a tapered profile. The portion 608 (i.e., the tapered profile) of the silicon sleeve 604b snuggly secures to the 602 while the outer housing 202 is inserted into the receptacle 106a through the aperture 602 (as shown in FIG. 6B). It is to be noted that the tapered profile (i.e., the portion 608) allows the insertion of the sensing device 200 to the receptacle 106a configured with an aperture of various dimensions. As the sensing device 200 (or the outer housing 202) secured with the silicon sleeve 604b is being inserted into the aperture 602, the silicon sleeve 604b is snuggly secured to the aperture 602 to form an air-tight seal between the sensing device 200 and the aperture 602. In this way, the sensing device 200 is suspended in the receptacle 106a. Further, the enclosure 220 removably secured to the top portion 214a of the inner housing 204 and a portion 606 of the silicon sleeve 604b are positioned outside the receptacle 106a while the sensing device 200 is secured to the receptacle 106a. In other words, the dimensions of the tapered profile (i.e., the portion 608) of the silicon sleeve 604b configured in conformity with the dimensions of the aperture 602 enable the snug mount between the portion 608 and the aperture 602. As a result, the enclosure 220 and the portion 608 of the silicon sleeve 604b are positioned outside the receptacle 106a.

The portion 606 of the silicon sleeve 604b may be dimensioned greater than the dimensions of the tapered profile (i.e., the portion 606) and the aperture 602.

Figure 3A:
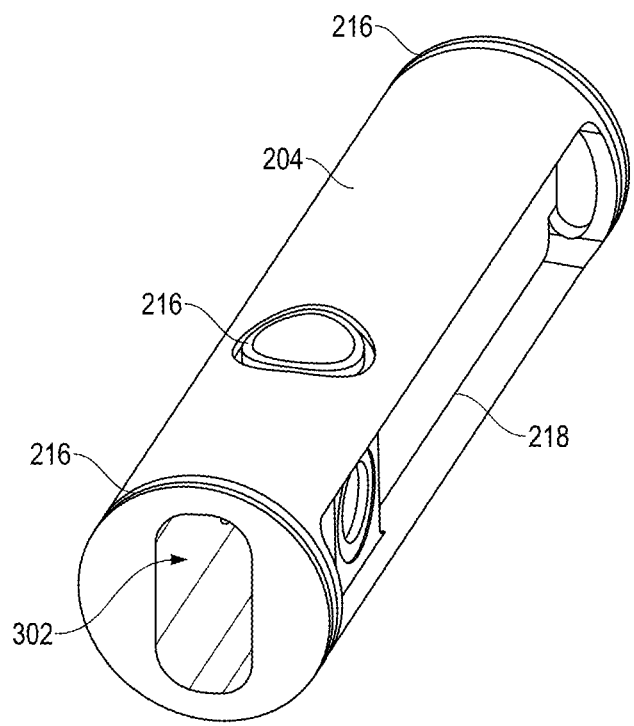
FIG. 3A is a schematic representation of an inner housing of the sensing device, in accordance with an embodiment of the present disclosure.

Referring to FIG. 3A in conjunction with FIG. 2A, the inner housing 204 includes a cavity 302 configured along a longitudinal axis X-X' of the inner housing 204. In other words, the cavity 302 is configured along at least a length of the inner housing 204. The cavity 302 is configured to include a cuboidal structure. In an embodiment, the cavity 302 may be configured to include a cylindrical structure. Alternatively, the cavity 302 may be configured in any shape as per the design feasibility and requirements.

Figure 3B:
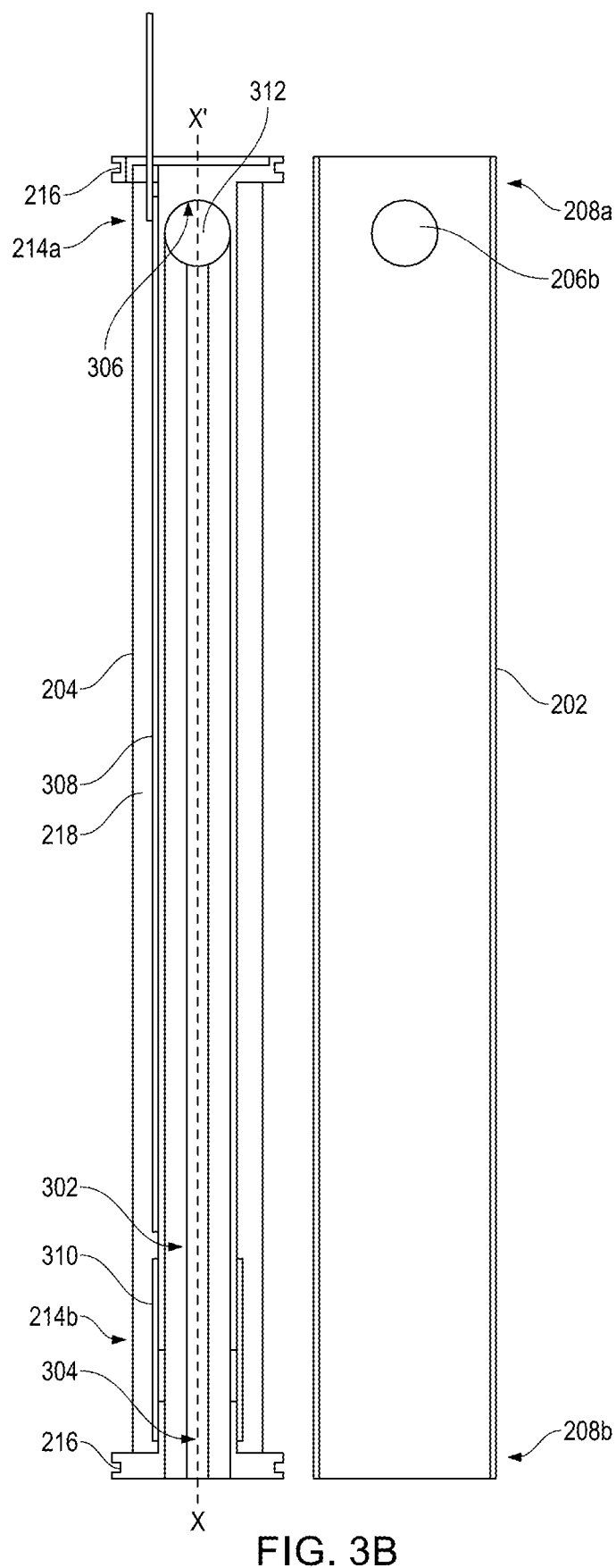
FIGS. 3B-3C represent a cross-sectional view of the inner housing and an outer housing of the sensing device along a cross-sectional axis A-A' of FIG. 2A, in accordance with an embodiment of the present disclosure.
Figure 3C:
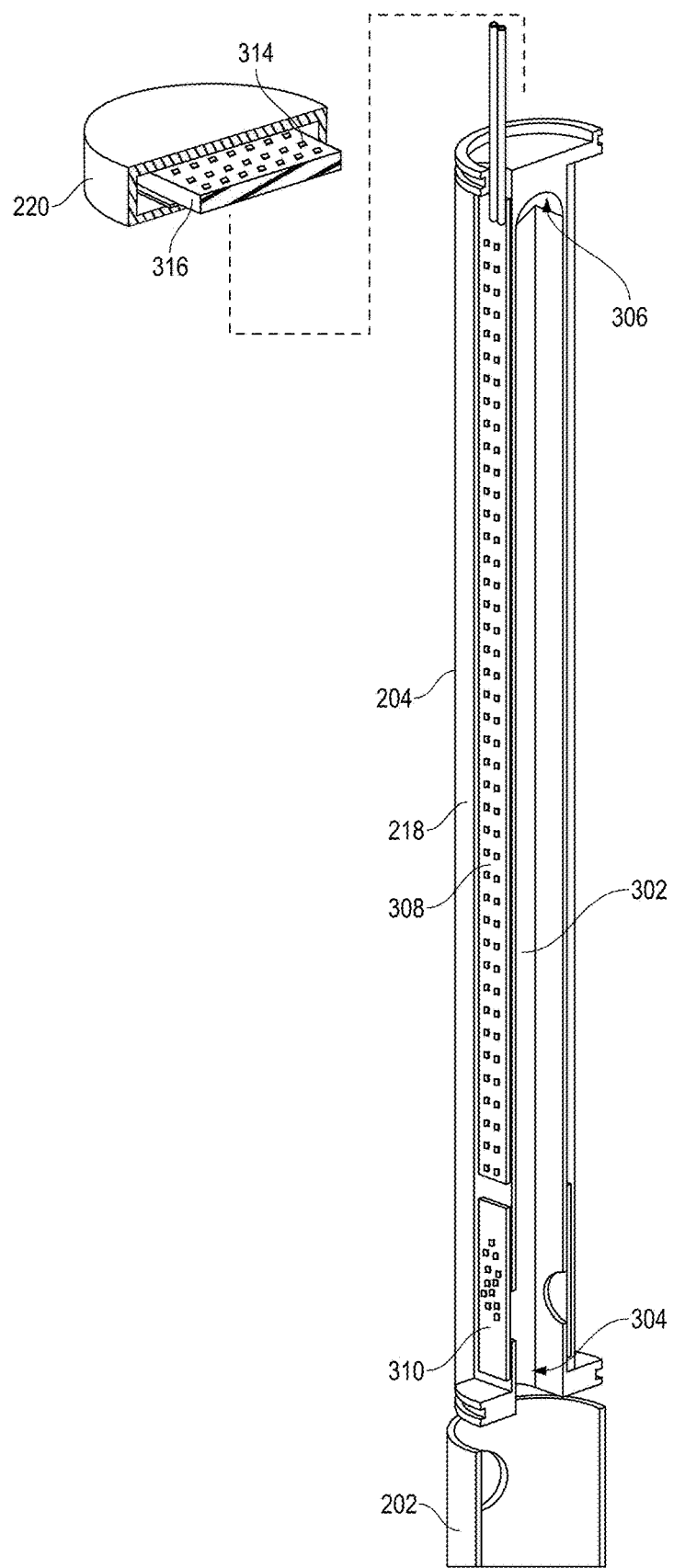

Referring to FIG. 3B in conjunction with FIG. 2A, a cross-sectional view of the inner housing 204 and the outer housing 202 along a cross-sectional axis A-A' is illustrated. Further, the cavity 302 is configured with an open configuration 304 at a bottom portion (see, 214b of FIG. 2A) of the inner housing 204. The cavity 302 is configured with a closed configuration 306 proximate to a top portion (see, 214a of FIG. 2A) of the inner housing 204. In other words, the cavity 302 configured in the inner housing 204 conforms to an inverted U-shaped structure (as shown in FIG. 3B).

Further, the outer housing 202 includes a set of first ports 206. The set of first ports 206 is configured at the top portion 208a of the outer housing 202. In particular, the set of first ports 206 includes a port 206a and a port 206b. The port 206a and the port 206b are configured at the top portion 208 of the outer housing 202 and are located on diametrically opposite sides of the outer housing 202 (as shown in FIG. 2A). The inner housing 204 includes the set of second ports 210. The set of second ports 210 is configured at the top portion 214a of the inner housing 204. In particular, the set of second ports 210 includes a port 212 and a port 312 (as shown in FIG. 3B). The port 212 and the port 312 are configured at the top portion 214a of the inner housing 204 and are located diametrically opposite sides of the inner housing 204.

As explained above, the inner housing 204 is inserted in the outer housing 202. It is to be noted that the inner housing 204 and the outer housing 202 are configured with a similar length dimension, thus enabling the outer housing 202 to secure the complete length of the inner housing 204 therein. Further, the set of second ports 210 is aligned parallel (or adjacent) to the set of first ports 206 while the inner housing 204 is removably secured to the outer housing 202 by inserting the top portion 214a of the inner housing 204 through a bottom portion 208b of the outer housing 202. More specifically, the port 206a is aligned parallel to the port 212 and the port 206b is aligned parallel to the port 312 when the inner housing 204 is secured within the outer housing 202 by inserting the top portion 214a inner housing 204 through the bottom portion 208b of the outer housing 202. It is to be understood that the inner housing 204 may be secured in the outer housing 202 by inserting the bottom portion 214b of the inner housing 204 through the top portion 208a of the outer housing 202.

The set of second ports 210 and the set of first ports 206 are configured to equalize a level of the portion of the fluid 108a in the cavity 302 and the fluid 108a stored in the receptacle 106a. Generally, the changes in ambient parameters (such as the ambient temperature, atmospheric pressure, and humidity) of the receptacle 106a create pressure imbalances between the interior of the sensing device 200 and the environment of the receptacle 106a. Thus, the set of first ports 206 and the set of second ports 210 may equalize pressure between the sensing device 200 (or the outer housing 202) and the receptacle 106a to prevent pressure buildup, which could affect the accuracy or integrity of the sensing device 200.

Further, the inner housing 204 is configured with at least one channel 218 along at least a length of the inner housing 204. The at least one channel 218 is configured to receive at least one first sensor module 308 and at least one second sensor module 310. As shown, the at least one first sensor module 308 disposed in the channel 218 extends from the top portion 214a and a central portion 214c of the inner housing 204. Further, the at least one second sensor module 214b disposed in the channel 218 is positioned at the bottom portion 214b of the inner housing 204.

The sensing device 200 includes an enclosure 220. The enclosure 220 may be removably coupled to the top portion 214a of the inner housing 204. In an embodiment, the enclosure 220 may be removably coupled to the top portion 214a of the inner housing 204 using conventional fastening means such as snap-fit configuration, threaded configuration, and the like. In one embodiment, the enclosure 220 may be magnetically coupled to the top portion 214a of the inner housing 204. It is to be noted that the enclosure 220 removably secured to the top portion 214a of the inner housing 204 is positioned outside the receptacle 106a while the sensing device 200 is secured to the receptacle 106a.

Figure 4:
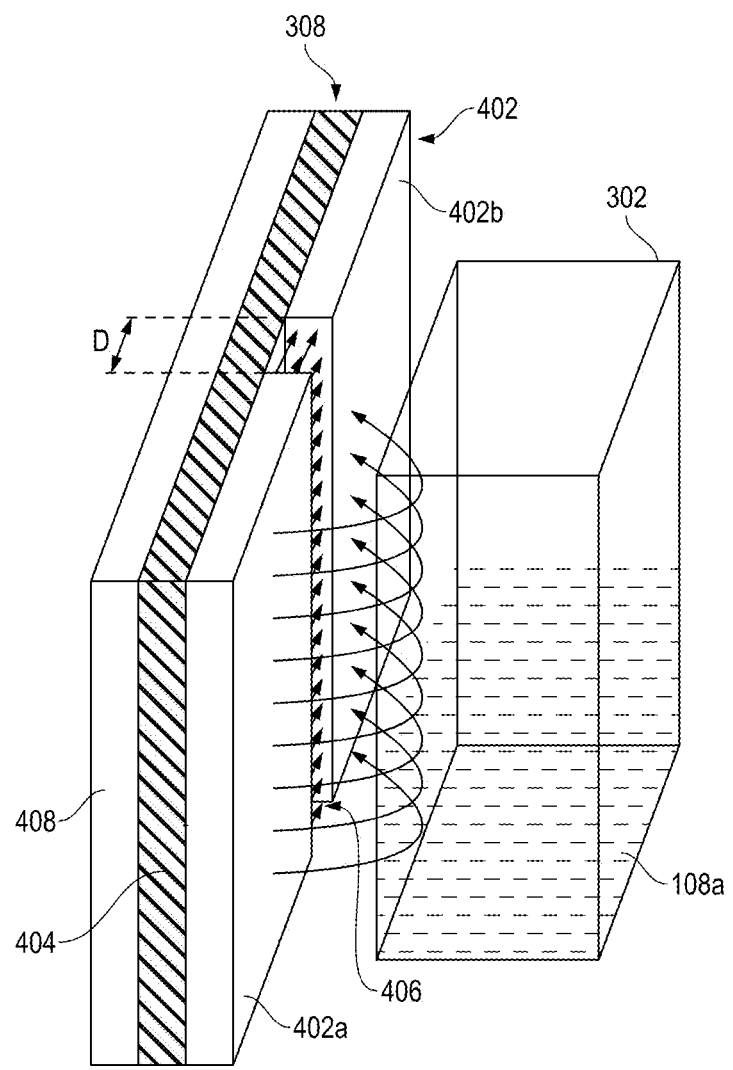
FIG. 4 illustrates a schematic representation of at least one first sensor module of the sensing device generating electric field lines due to at least one electrical parameter, in accordance with an embodiment of the present disclosure.

Referring to FIG. 4 in conjunction with FIG. 3B, the at least one first sensor module 308 (hereinafter interchangeably referred to as 'the first sensor module 308') is configured to detect the fluid fill metric of the fluid 108a in the receptacle 106a over time. The first sensor module 308 detects the fluid fill metric of the fluid 108a in the receptacle 106a based on determining at least one electrical parameter associated with the portion of the fluid 108a stored in the cavity 302 of the inner housing 204. Generally, during the aging of the fluid 108a (such as the wine), some evaporative loss occurs. Since, water molecules, being smaller than alcohol molecules, primarily escape from the barrel (such as the receptacle 106a), thus increasing the alcohol concentration. This phenomenon is known as the "angel's share". The reduction in water content typically leads to a higher ABV (Alcohol by Volume). Humidity significantly influences evaporative loss, with an average loss of 2-3% per year. The at least one electrical parameter of the wine (i.e., the fluid 108a) changes over time due to the changing mixture in the receptacle 106a. Thus, the variation of the electrical parameter is being tracked by the sensing device 200 over time to determine the fluid fill metric of the fluid 108a in the receptacle 106a and evaluate the fluid quality of the fluid 108a in the receptacle 106a.

As shown in FIG. 4, the first sensor module 308 includes a set of electrodes 402 arranged in a co-planar configuration. In particular, the set of electrodes 402 includes an electrode 402a and an electrode 402b. For example, the electrodes 402a and 402b may be made of copper materials. The electrode 402a may be a driving plate and the electrode 402b may be a receiving plate or vice-versa. The electrodes 402a and 402b are arranged in the co-planar configuration on a substrate 404. The electrodes 402a and 402b arranged on the substrate 404 in the co-planar configuration are separated by a predefined distance 'D'. The substrate 404 may be made of materials such as Fiberglass Epoxy Laminate (FR4), Ceramic, Polymide, Silicone-Coated Polymer, Polyethylene Terephthalate (PET), Polyethylene Terephthalate (PET), Polytetrafluoroethylene (PTFE, e.g., Teflon), and the like. Further, the predefined distance 'D' between the electrodes 402a and 402b directly affects its sensitivity, depth of field, resolution, power consumption, and signal clarity.

In operation, the set of electrodes 402 is configured to generate an electric field (see, 406 of FIG. 4) based on the at least one electrical parameter of the portion of the fluid 108a stored in the cavity 302. For illustration purposes, the cavity 302 is represented as a cuboidal structure. The at least one electrical parameter corresponds to a dielectric constant. In particular, the electric field 406 distribution between the electrodes 402a and 402b in the sensing device 200 is based on the dielectric properties of the materials in the sensing region. In the co-planar configuration, the electric field 406 extends from the driving electrode (i.e., the electrode 402a) to the receiving electrode (i.e., the electrode 402b) and changes based on the dielectric constant (or permittivity) of the materials (such as the fluid 108a) it encounters. Generally, when a voltage is applied to the electrode 402a, it creates an electric field (such as the electric field 406) that extends toward the electrode 402b. The electric field 406 forms an arc-like shape that peaks above an electrode surface, covering the area directly above and between the electrodes 402a and 402b. In other words, the electric field lines curve through the space above the electrodes 402a and 402b, traveling from the positively charged driving electrode (i.e., the electrode 402a) to the grounded (or negatively charged) receiving electrode (i.e., the electrode 402b).

Further, each material (air, water, wine, etc.) has a specific dielectric constant ($\varepsilon$). The dielectric constant determines how much the material resists the electric field (such as the electric field 406). In general, the materials with a high dielectric constant (e.g., water or wine) will concentrate the field more strongly compared to materials with a low dielectric constant (e.g., air). Thus, when a material (such as the portion of the fluid 108a in the cavity 302) with a higher dielectric constant is present in proximity to the first sensor module 308, the electric field (such as the electric field 406) becomes more concentrated within that material.

Over time, as the fluid 108a level changes in the receptacle 106a, the proportion of the electric field 406 passing through the fluid 108a versus the air also changes. Thus, when the fluid 108a level is high in cavity 302, most of the field lines (such as the electric field 406) extend through the fluid 108a (wine), resulting in a higher effective dielectric constant between the electrodes 402a and 402b. As the fluid 108a level moves decreases due to evaporation, the electric field 406 encounters an interface between the fluid 108a and air. This interface creates a transition zone where the effective dielectric constant shifts from high (wine) to low (air), resulting in a measurable change in capacitance. The capacitance between the electrodes 402a and 402b is proportional to the dielectric constant of the materials (such as the fluid 108a) in the sensing zone (i.e., the cavity 302). Higher dielectric constants lead to higher capacitance, while lower constants (such as air) lead to lower capacitance.

In particular, the first sensor module 308 including the set of electrodes 402 is configured to detect a first capacitance ($C_{level}$) associated with the set of electrodes 402. In other words, the electric field 406 between the set of electrodes 402 indicates the first capacitance ($C_{level}$) associated with the set of electrodes 402. As shown, the electric field 406 passes through different media with unique dielectric properties (such as air, the fluid 108a, the inner housing 204, etc.,). Thus, the first capacitance indicates the presence and thickness of the fluid 108a layer in the cavity 302. In other words, the first capacitance ($C_{level}$) is detected while the portion of the fluid 108a is present in the cavity 302 of the sensing device 200. Further, the first capacitance ($C_{level}$) may be detected frequently (or at predefined intervals, for example, 1 month) as the fluid 108a level changes in the receptacle 106a. Further, the first sensor module 308 including the set of electrodes 402 may be configured to detect a second capacitance ($C_{level(0)}$) between the set of electrodes 402 while the receptacle 106a is empty. Additionally, a reference sensor module (not shown in figures) may be used to detect a first reference capacitance associated with a reference liquid stored in the receptacle, and a second reference capacitance associated with ambient parameters of the receptacle 106a. The first reference capacitance may be detected in a controlled or known liquid level scenario, often corresponding to a specific height or fill level within the receptacle 106a. Since environmental factors (like temperature and humidity) can affect capacitance readings, the reference sensor module provides a consistent baseline measurement that helps calibrate the sensing device 200. The fluid fill metric of the fluid 108a in the receptacle 106a may be computed by using the equation (Eq. 1).

$$\text{Fluid fill metric} = h_{RL} \frac{c_{level} - c_{level}(0)}{c_{RL} - c_{RE}} \quad \text{Eq. 1}$$

Wherein,
$C_{RL}$ is the first reference capacitance,
$C_{RE}$ is the second reference capacitance,
$C_{level}$ is the current value of the first capacitance measured at the set of electrodes 402,
$C_{level(0)}$ is the second capacitance of the set of electrodes 402 when the receptacle 106a is empty, and
$h_{RL}$ is a scaling factor such as the height in the desired units of the receptacle 106a, usually, the value of the parameter ($h_{RL}$) is 1.

Thus, it is to be noted that the fluid fill metric of the fluid 108a in the receptacle 106a is determined based at least on implementing a ratio-metric computing technique as explained with reference to Eq. 1. The ratio-metric computing technique is implemented on the first capacitance ($C_{level}$), the second capacitance ($C_{level(0)}$), the first reference capacitance ($C_{RL}$) of the reference liquid being stored in the receptacle 106a, the second reference capacitance ($C_{RE}$) associated with ambient parameters of the receptacle 106a, and the scaling factor ($h_{RL}$). Further, by calibrating the sensing device 200 with known reference capacitance values such as the first reference capacitance ($C_{RL}$) and the second reference capacitance ($C_{RE}$) (one for a full barrel and one for an empty barrel), the fluid fill metric may be interpolated based on the current capacitance value such as the first capacitance ($C_{level}$), the second capacitance ($C_{level(0)}$) relative to the reference capacitance values.

Additionally, the first sensor module 308 may include a shielding plate 408. The shielding plate 408 ensures that the electric field 406 focuses on the area of interest (such as the cavity 302 storing the fluid 108a), thus increasing the sensitivity of the first sensor module 308 to the fluid level.

Further, a secondary sensor in the sensing device 200 may be used to avoid errors from environmental effects such as humidity and temperature. The secondary sensor of the sensing device 200 includes at least one second sensor module 310 and at least one third sensor module 314. Further, the sensing device 200 includes a control circuitry 316. The control circuitry 316 may be disposed in the enclosure 220, or any other locations in the inner housing 204 or the outer housing 202 as per the design feasibility and requirements. The control circuitry 316 is communicably coupled to the at least one first sensor module 308, the at least one second sensor module 310, and the at least one third sensor module 314.

The at least one second sensor module 310 is disposed in the inner housing 204. In particular, the at least one second sensor module 310 is disposed in the channel 218 and located proximate to the bottom portion 214b of the inner housing 204. The at least one second sensor module 310 may include an optical sensor. The optical sensor may include an Infrared (IR) sensor, a laser-based distance sensor, and the like. The at least one second sensor module 310 is configured to at least detect one or more parameters associated with the portion of the fluid 108a. The one or more parameters of the fluid 108a may include phenolic compounds, oxygen, carbon dioxide, acidic concentration, alcohol content, pH value, sugar content, phenolic compounds, volatile compounds, and the like. The acidic concentration of the fluid 108a may include acetic acid, malic acid, lactic acid, and titratable acid of the fluid 108a. Further, the volatile compounds may include Sulfur dioxide ($SO_2$).

Further, the at least one second sensor module 310 may implement near-infrared (NIR) or ultraviolet (UV)-visible spectroscopy to analyze the one or more parameters of the fluid 108a in cavity 302. Typically, specific wavelengths of the radiating light emitted by the second sensor module 310 are absorbed by different molecular bonds (such as O—H, C—H, and N—H bonds) of the fluid 108a (e.g., wine) stored in the cavity 302. Thus, by shining specific wavelengths of light into the fluid 108a in the cavity 302 and measuring optical properties (such as absorbance, reflectance, or fluorescence), the at least one second sensor module 310 provides information on the one or more parameters of the fluid 108a. Additionally, the at least one second sensor module 310 may determine the clarity or turbidity of the fluid 108a based on the measured optical properties. This can be a quality indicator, as sediment or haze can affect the visual appeal of the fluid 108a (e.g., wine). Further, optical sensor (or the at least one second sensor module 310) may measure environmental factors like humidity and temperature within the receptacle 106a.

The at least one third sensor module 314 may be disposed in the enclosure 220. The at least one third sensor module 314 is configured to determine at least the ambient parameters of the receptacle 106a. The ambient parameters of the receptacle 106a may include, but are not limited to, an ambient temperature and humidity.

The control circuitry 316 determines the fluid fill metric of the fluid 108a in the receptacle 106a based at least on the at least one electrical parameter associated with the portion of the fluid 108a in the cavity 302 of the inner housing 204 and the ambient parameters of the receptacle 106a. The fluid fill metric indicates a ratio of a first element and a second element of the fluid 108a stored in the receptacle 106a. For example, the fluid 108a may be bourbon. In this example scenario, the first element may include water and the second element may include an alcohol content of the fluid 108a. Thus, a change in the dielectric constant for the fluid 108a determined corresponding to the change in capacitance indicates a change in the water/alcohol ratio. Further, detecting the real-time shift in the capacitance due to the dielectric constant leads to continuously monitoring the fluid fill metric of the fluid 108a in the receptacle 106a and an evaporation rate. In other words, by continuously monitoring the capacitance values as explained above and applying compensations due to environmental influences (or the ambient parameters), the control circuitry 316 provides real-time updates on the fluid fill metric of the fluid 108a in the receptacle 106a. This enables to detection of issues like rapid evaporation or leakage.

Additionally, the sensing device 200 may include a power source (not shown in figures). The power source may be disposed in the enclosure 220. The power source provides power supply to at least the control circuitry 316, the at least one first sensor module 308, the at least one second sensor module 310, the at least one third sensor module 314, and any other electronic components of the sensing device 200. The power source may provide one of an alternating current output or a direct current output. In an embodiment, the power source includes a direct current power source, such as a rechargeable battery (for example, a lithium-ion battery), operable to provide the required electrical power for the operation of the sensing device 200. Further, the power source may include electrical and/or electronic components or circuits for enabling the use of wired or wireless charging. Alternatively, the power source may include electrical and/or electronic components or circuits for enabling the use of alternating current to provide the required electrical power for the operation of the sensing device 200. Further, the sensing device 200 may include a charging port (not shown in figures) to plug an electric line for receiving electric power for charging the power source.

Figure 5:
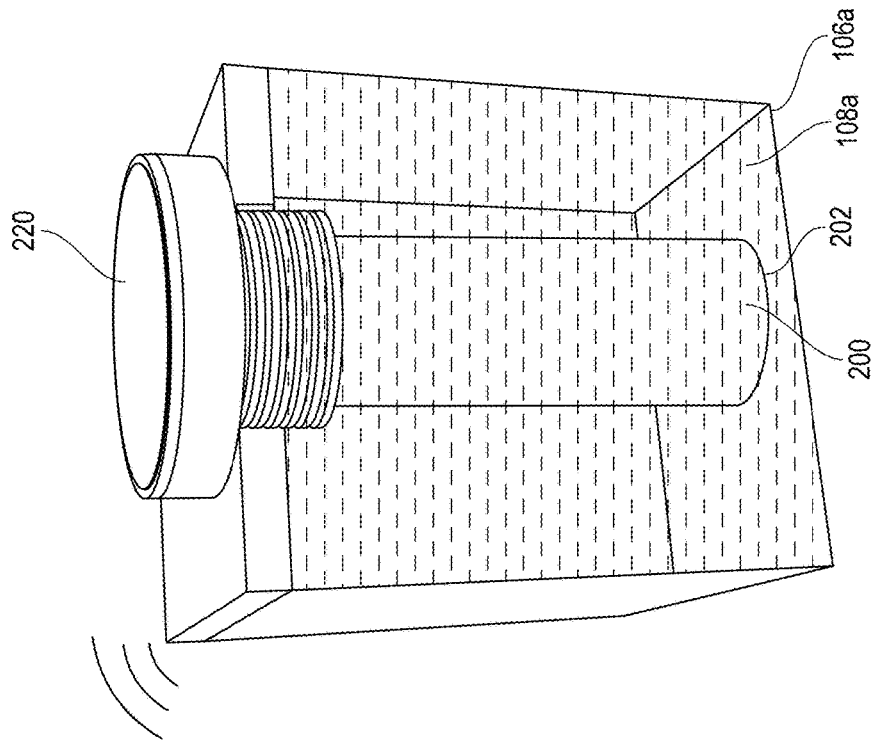
FIG. 5 illustrates a schematic representation depicting the communicable coupling of the sensing device inserted into a receptacle and a central control module, in accordance with an embodiment of the present disclosure.
Figure 5:
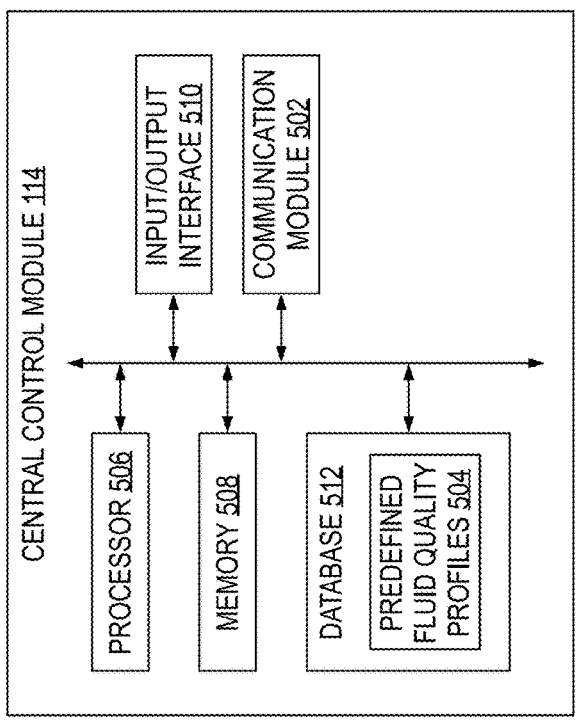

FIG. 5 illustrates a schematic representation depicting the communicable coupling of the sensing device 200 inserted into the receptacle 106a and the central control module 114, in accordance with an embodiment of the present disclosure. As explained above, the sensing device 200 is inserted into the receptacle 106a for real-time tracking of the fluid 108a in the receptacle 106a. Further, the portion of the fluid 108a enters the cavity 302 when the sensing device 200 is inserted into the receptacle 106a. As explained above, the control circuitry 316 determines the fluid fill metric of the fluid 108a in the receptacle 106a based at least on the at least one electrical parameter associated with the portion of the fluid 108a in the cavity 302 and the ambient parameters of the receptacle 106a. The fluid fill metric indicates the ratio of the first element and the second element of the fluid 108a stored in the receptacle 106a. Thereafter, the control circuitry 316 generates sensory data based at least on processing the fluid fill metric and one or more parameters related to the fluid 108a stored in the receptacle 106a. The one or more parameters of the fluid 108a corresponds to the one or more parameters of the fluid 108a. Further, the control circuitry 316 transmits the sensory data to the central control module 114 via a communication interface (not shown in figures) associated with the sensing device 200.

The central control module 114 includes at least one processor, such as a processor 506 and a memory 508. It is noted that although the central control module 114 is depicted to include only one processor, the central control module 114 may include more processors therein. In an embodiment, the memory 508 is capable of storing machine-executable instructions. Further, the processor 506 is capable of executing the machine-executable instructions to perform one or more operations described herein. In an embodiment, the processor 506 may be embodied as a multi-core processor, a single-core processor, or a combination of one or more multi-core processors and one or more single-core processors. For example, the processor 506 may be embodied as one or more of various processing devices, such as a coprocessor, a microprocessor, a controller, a Digital Signal Processor (DSP), a processing circuitry with or without an accompanying DSP, or various other processing devices including integrated circuits such as, for example, an Application Specific Integrated Circuit (ASIC), a Field Programmable Gate Array (FPGA), a microcontroller unit (MCU), a hardware accelerator, a special-purpose computer chip, or the like. In an embodiment, the processor 506 may be configured to execute hard-coded functionality. In an embodiment, the processor 506 is embodied as an executor of software instructions, wherein the instructions may specifically configure the processor 506 to perform the algorithms and/or operations described herein when the instructions are executed.

The memory 508 may be embodied as one or more volatile memory devices, one or more non-volatile memory devices, and/or a combination of one or more volatile memory devices and non-volatile memory devices. For example, the memory 508 may be embodied as semiconductor memories (such as mask (ROM), programmable ROM (PROM, Erasable PROM (EPROM), flash memory, Random Access Memory (RAM), etc.), magnetic storage devices (such as hard disk drives, floppy disks, magnetic tapes, etc.), optical magnetic storage devices (e.g., magneto-optical disks), Compact Disc Read Only Memory (CD-ROM), Compact Disc Recordable (CD-R), Compact Disc Rewritable (CD-R/W), Digital Versatile Disc (DVD) and BLU-RAY® Disc (BD).

The central control module 114 further includes an Input/Output (I/O) module 510 (hereinafter referred to as an 'I/O module 510') and at least one communication module such as a communication module 502. In an embodiment, the I/O module 510 may include mechanisms configured to receive inputs (or the sensory data from the sensing device 200) and provide outputs to the user 102a through the application 118. In an embodiment, the processor 506 may include I/O circuitry configured to control at least some functions of one or more elements of the I/O module 510, such as, for example, a speaker, a microphone, a display, and/or the like. The processor 506 and/or the I/O circuitry may be configured to control one or more functions of the one or more elements of the I/O module 510 through computer program instructions, for example, software and/or firmware, stored on a memory, for example, the memory 508, and/or the like, accessible to the processor 506.

The communication module 502 may include communication circuitry such as for example, a transceiver circuitry including antenna and other communication media interfaces to connect to a wired and/or wireless communication protocol. The communication circuitry may, in at least some example embodiments, enable the transmission of data signals and/or reception of signals from other network entities, such as the plurality of sensors, the user device 104, the control circuitry 316, or other entities of FIG. 1.

In an embodiment, the processor 506 receives the sensory data from the control circuitry 316 via the communication interface. The processor 506 is configured to determine the fluid quality of the fluid 108a stored in the receptacle 106a based at least on the sensory data. In particular, the fluid quality is determined by mapping the sensory data of the fluid 108a with a data model (i.e., a database 512) including a set of predefined fluid quality profiles 504. The set of predefined fluid quality profiles 504 may include a large group of fluid samples (ranging from old to fresh samples)

of various wines or spirits (i.e., the fluid) and a threshold range for each of the one or more parameters related to the set of fluid samples.

Similarly, the central control module 114 may be configured to receive the sensory data from the sensing device 110*b*-110*c* equipped in the receptacles 106*b*-106*c*, respectively. The central control module 114 is configured to determine the fluid quality of the fluids 108*b*-108*c* in the receptacles 106*b*-106*c*, respectively.

Figure 7:
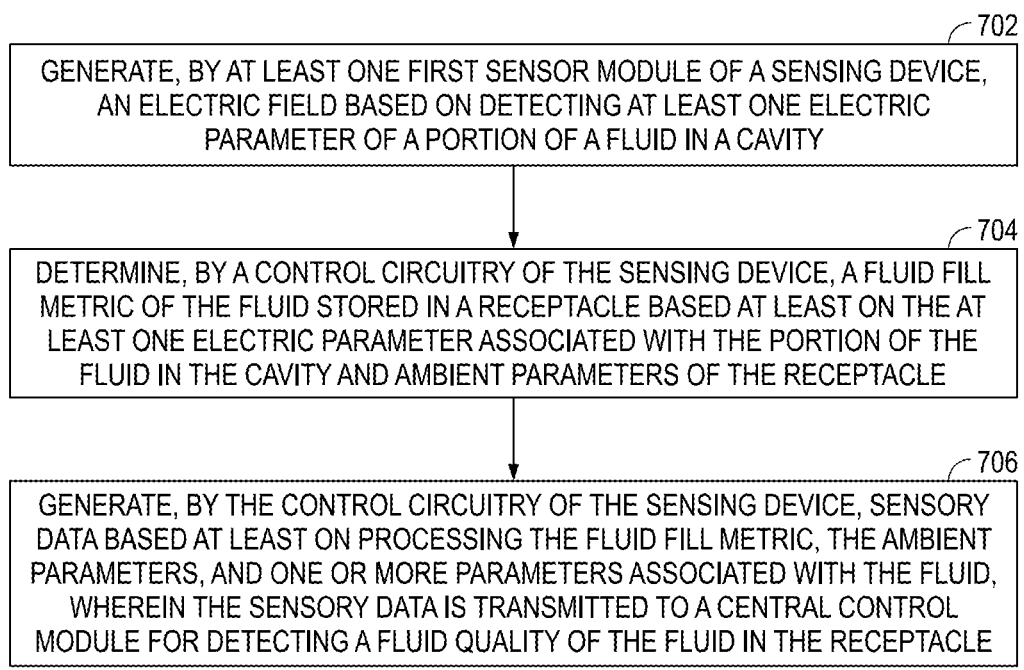
FIG. 7 illustrates a flow diagram of a method for determining a fluid fill metric of a fluid in the receptacle, in accordance with an embodiment of the present disclosure.

FIG. 7 illustrates a flow diagram of a method 700 for determining the fluid fill metric of the fluid, in accordance with an embodiment of the present disclosure. The method 700 depicted in the flow diagram may be executed by, for example, the sensing device 110*a*-110*c*/the sensing device 200. Operations of the flow diagram of the method 700, and combinations of the operations in the flow diagram of the method 700, may be implemented by, for example, hardware, firmware, a processor, circuitry, and/or a different device associated with the execution of software that includes one or more computer program instructions. The method 700 starts at operation 702.

At operation 702, the method 700 includes generating, by the at least one first sensor module 308 of the sensing device 200, the electric field based on detecting the at least one electric parameter of the portion of the fluid 108*a* in the cavity 302.

At operation 704, the method 700 includes determining, by the control circuitry 316 of the sensing device 200, the fluid fill metric of the fluid 108*a* stored in the receptacle 106*a* based at least on the at least one electric parameter associated with the portion of the fluid 108*a* in the cavity 302 and ambient parameters of the receptacle 106*a*.

At operation 706, the method 700 includes generating, by the control circuitry 316 of the sensing device 200, the sensory data based at least on processing the fluid fill metric, the ambient parameters, and the one or more parameters associated with the fluid 108*a*. The sensory data is transmitted to the central control module 114 for detecting the fluid quality of the fluid 108*a* in the receptacle 106*a*. Further, the one or more operations for determining the fluid fill metric and the fluid quality are already explained with reference to FIG. 1 to FIGS. 6A-6B, therefore they are not reiterated herein for the sake of brevity.

Various embodiments of the disclosure, as discussed above, may be practiced with steps and/or operations in a different order, and/or with hardware elements in configurations, which are different than those which are disclosed. Therefore, although the disclosure has been described based on these exemplary embodiments, it is noted that certain modifications, variations, and alternative constructions may be apparent and well within the spirit and scope of the disclosure.

Although various exemplary embodiments of the disclosure are described herein in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:
1. A sensing device, comprising:
an outer housing;
an inner housing comprising a cavity along a longitudinal axis of the inner housing, the outer housing configured in conformity to the inner housing for receiving the inner housing therein, wherein the cavity of the inner housing is adapted to receive a portion of a fluid stored in a receptacle while the sensing device is inserted into the receptacle;
at least one first sensor module disposed in the inner housing, the at least one first sensor module configured to generate an electric field based on detecting at least one electrical parameter of the portion of the fluid in the cavity, wherein the at least one first sensor module comprises a set of electrodes, wherein the electric field between the set of electrodes indicates a first capacitance associated with the set of electrodes, and wherein the at least one first sensor module is further configured to detect a second capacitance while the receptacle is empty; and
a control circuitry communicably coupled to the at least one first sensor module, the control circuitry configured at least, in part to:
determine a fluid fill metric of the fluid in the receptacle based at least on the at least one electrical parameter associated with the portion of the fluid in the cavity of the inner housing and ambient parameters of the receptacle, wherein the fluid fill metric indicates a ratio of a first element and a second element of the fluid stored in the receptacle, wherein the fluid fill metric of the fluid in the receptacle is determined based at least on implementing a ratio-metric computing technique on the first capacitance, the second capacitance, a first reference capacitance of a reference liquid stored in the receptacle, a second reference capacitance associated with the ambient parameters of the receptacle, and a scaling factor, and
generate sensory data based at least on processing the fluid fill metric, the ambient parameters, and one or more parameters associated with the fluid, wherein the sensory data is transmitted to a central control module for detecting a fluid quality of the fluid in the receptacle.

2. The sensing device as claimed in claim 1, further comprising:
at least one second sensor module disposed in the inner housing, wherein the at least one second sensor module is configured to at least detect the one or more parameters associated with the fluid, wherein the one or more parameters associated with the fluid comprises phenolic compounds, oxygen, carbon dioxide, acidic concentration, alcohol content, pH value, sugar content, and volatile compounds; and
at least one third sensor module configured to detect the ambient parameters of the receptacle, the ambient parameters comprising temperature and humidity.

3. The sensing device as claimed in claim 1, wherein the set of electrodes are arranged in a co-planar configuration, the set of electrodes configured to generate the electric field based on the at least one electrical parameter of the portion of the fluid in the cavity of the inner housing, wherein the at least one electrical parameter corresponds to a dielectric constant.

4. The sensing device as claimed in claim 1, wherein the first element comprises water, and the second element comprises at least one of alcohol content of the fluid, and wherein the ratio of the first element to the second element of the fluid in the receptacle indicates the fluid quality of the fluid in the receptacle.

5. The sensing device as claimed in claim 1, wherein the inner housing is configured with at least one channel along at least a length of the inner housing, and wherein the at least one first sensor module and at least one second sensor module are disposed in the at least one channel of the inner housing.

6. The sensing device as claimed in claim 1, wherein the outer housing comprises a set of first ports configured at a top portion of the outer housing and the inner housing comprises a set of second ports configured at a top portion of the inner housing, and wherein the set of second ports is aligned parallel to the set of first ports while the inner housing is removably secured to the outer housing by inserting the top portion of the inner housing through a bottom portion of the outer housing.

7. The sensing device as claimed in claim 6, wherein the set of second ports and the set of first ports are configured to equalize a level of the portion of the fluid in the cavity and the fluid stored in the receptacle.

8. The sensing device as claimed in claim 1, wherein the cavity is configured with an open configuration at a bottom portion of the inner housing and a closed configuration at a top portion of the inner housing.

9. The sensing device as claimed in claim 1, wherein the outer housing is configured using stainless steel.

10. The sensing device as claimed in claim 1, wherein a top portion of the outer housing is configured with at least one fastening member for snuggly securing the sensing device to at least one complementary fastening member configured in an aperture of the receptacle designed for receiving the sensing device therein.

11. The sensing device as claimed in claim 10, wherein the at least one fastening member comprises a plurality of helical structures.

12. The sensing device as claimed in claim 10, wherein the at least one fastening member comprises a silicon sleeve.

13. A method for determining a fluid fill metric, comprising:
generating, by at least one first sensor module of a sensing device, an electric field based on detecting at least one electric parameter of a portion of a fluid in a cavity;
determining, by a control circuitry of the sensing device, the fluid fill metric of the fluid stored in a receptacle based at least on the at least one electric parameter associated with the portion of the fluid in the cavity and ambient parameters of the receptacle, wherein the fluid fill metric indicates a ratio of a first element and a second element of the fluid stored in the receptacle, wherein the fluid fill metric of the fluid in the receptacle is determined based at least on implementing a ratio-metric computing technique on a first capacitance, a second capacitance, a first reference capacitance of a reference liquid stored in the receptacle, a second reference capacitance associated with the ambient parameters of the receptacle, and a scaling factor; and
generating, by the control circuitry of the sensing device, sensory data based at least on processing the fluid fill metric, the ambient parameters, and one or more parameters associated with the fluid, wherein the sensory data is transmitted to a central control module for detecting a fluid quality of the fluid in the receptacle.

14. The method as claimed in claim 13, further comprising:
detecting, by at least one second sensor module of the sensing device, the one or more parameters associated with the fluid, the one or more parameters of the fluid comprising phenolic compounds, oxygen, carbon dioxide, acidic concentration, alcohol content, pH value, sugar content, and volatile compounds; and
detecting, by at least one third sensor module, the ambient parameters of the receptacle, the ambient parameters comprising temperature and humidity.

15. The method as claimed in claim 13, wherein,
the first capacitance is indicative of the electric field between a set of electrodes of the at least one first sensor module being generated while the portion of the fluid is in the cavity, and
the second capacitance is indicative of one or more parameters associated with the portion of the fluid, the one or more parameters of the fluid comprising phenolic compounds, oxygen, and carbon dioxide.

16. The method as claimed in claim 13, wherein the first element comprises water, and the second element comprises at least one of alcohol content of the fluid, and
wherein the ratio of the first element to the second element of the fluid in the receptacle indicates the fluid quality of the fluid in the receptacle.

17. A sensing device, comprising:
an outer housing;
an inner housing comprising a cavity along a longitudinal axis of the inner housing, the outer housing configured in conformity to the inner housing for receiving the inner housing therein, wherein the cavity of the inner housing is adapted to receive a portion of a fluid stored in a receptacle while the sensing device is inserted into the receptacle;
at least one first sensor module disposed in the inner housing, the at least one first sensor module configured to generate an electric field based on detecting at least one electrical parameter of the portion of the fluid in the cavity; and
a control circuitry communicably coupled to the at least one first sensor module, the control circuitry configured at least, in part to:
determine a fluid fill metric of the fluid in the receptacle based at least on the at least one electrical parameter associated with the portion of the fluid in the cavity of the inner housing and ambient parameters of the receptacle, wherein the fluid fill metric of the fluid in the receptacle is determined based at least on implementing a ratio-metric computing technique on a first capacitance, a second capacitance, a first reference capacitance of a reference liquid stored in the receptacle, a second reference capacitance associated with the ambient parameters of the receptacle, and a scaling factor, and
generate sensory data based at least on processing the fluid fill metric, the ambient parameters and one or more parameters associated with the fluid, wherein the sensory data is transmitted to a central control module for detecting a fluid quality of the fluid in the receptacle,
wherein the fluid fill metric indicates a ratio of a first element and a second element of the fluid stored in the receptacle, the first element comprising water, and the second element comprising at least one of alcohol content of the fluid, and
wherein the ratio of the first element to the second element of the fluid in the receptacle indicates the fluid quality of the fluid in the receptacle.

* * * * *